US008027521B1

United States Patent
Moon et al.

(10) Patent No.: US 8,027,521 B1
(45) Date of Patent: Sep. 27, 2011

(54) METHOD AND SYSTEM FOR ROBUST HUMAN GENDER RECOGNITION USING FACIAL FEATURE LOCALIZATION

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 855 days.

(21) Appl. No.: 12/079,276

(22) Filed: Mar. 25, 2008

(51) Int. Cl.
*G06K 9/62* (2006.01)

(52) U.S. Cl. ........................................................ 382/118

(58) Field of Classification Search .................. None
See application file for complete search history.

(56) References Cited

U.S. PATENT DOCUMENTS

| | | | |
|---|---|---|---|
| 5,488,429 A | 1/1996 | Kojima et al. |
| 5,537,488 A | 7/1996 | Menon et al. |
| 5,781,650 A | 7/1998 | Lobo et al. |
| 5,852,669 A | 12/1998 | Eleftheriadis et al. |
| 6,219,639 B1 | 4/2001 | Bakis et al. |
| 6,690,822 B1 | 2/2004 | Chen et al. |
| 6,711,286 B1 | 3/2004 | Chen et al. |
| 6,829,384 B2 | 12/2004 | Schneiderman et al. |
| 6,990,217 B1 | 1/2006 | Moghaddam et al. |
| 7,031,499 B2 | 4/2006 | Viola et al. |
| 7,058,209 B2 | 6/2006 | Chen et al. |
| 2003/0110038 A1* | 6/2003 | Sharma et al. ................ 704/270 |
| 2003/0202704 A1* | 10/2003 | Moghaddam et al. ........ 382/224 |
| 2005/0041867 A1 | 2/2005 | Loy et al. |
| 2006/0066912 A1 | 3/2006 | Kagaya |
| 2007/0274572 A1* | 11/2007 | Nishino ......................... 382/118 |

OTHER PUBLICATIONS

U.S. Appl. No. 10/972,316, Agrawal et al.
U.S. Appl. No. 11/811,614, Moon et al.
Ueki, et al., "A method of gender classification by integrating facial, hairstyle, and clothing images," in Proceedings of the 17th International Conference on Pattern Recognition, 2004.

* cited by examiner

*Primary Examiner* — Brian Werner

(57) ABSTRACT

The present invention is a method and system to provide a face-based automatic gender recognition system that utilizes localized facial features and hairstyles of humans. Given a human face detected from a face detector, it is accurately localized to facilitate the facial/hair feature detection and localization. Facial features are more finely localized using the geometrically distributed learning machines. Then the position, size, and appearance information of the facial features are extracted. The facial feature localization essentially decouples geometric and appearance information about facial features, so that a more explicit comparison can be made at the recognition stage. The hairstyle features that possess useful gender information are also extracted based on the hair region segmented, using the color discriminant analysis and the estimated geometry of the face. The gender-sensitive feature vector, made up from the extracted facial and hairstyle features, is fed to the gender recognition machines that have been trained using the same kind of gender-sensitive feature vectors of gallery images.

28 Claims, 13 Drawing Sheets

METHOD AND SYSTEM FOR ROBUST HUMAN GENDER RECOGNITION USING FACIAL FEATURE LOCALIZATION

BACKGROUND OF THE INVENTION

1. Field of the Invention

The present invention is a method and system to provide a face-based automatic gender recognition system that utilizes automatically decoupled facial feature geometry and appearance information, and automatically extracted hairstyle of humans.

2. Background of the Invention

Automatic gender recognition using images has a wide range of applications such as security, marketing, and computer user interface. Online applications, such as computer user interface, or gender targeted advertisements, especially demand highly accurate gender recognition capabilities.

Traditional gender recognition methods make use of holistic facial appearance and/or bodily features that are specific to certain dress codes or ethnic groups. The use of holistic facial appearance for gender recognition fits well into the framework of machine learning-based classification, because facial appearance has common structure across the human population to be compared against each other, and at the same time provides useful appearance information to differentiate gender. It is well known in the pattern analysis community that one can achieve higher recognition accuracy when the patterns are aligned more accurately. In general, when the overall patterns are aligned, the learning machine does a better job of identifying the fine-level features necessary for identifying the difference between classes.

For the gender recognition problem, the manner through which the human brain processes the visual information from a human face to determine gender is not completely understood. However, there are certain features that are known to contribute more to the task of gender recognition; studies revealed that certain parts of the face or facial features provide more decisive image information for gender recognition. For example, there is a general consensus that differences in the size and shape between male eyebrows and female eyebrows exist.

On the other hand, studies have revealed that using only facial image for gender recognition has limitations; even gender recognition by humans using only facial images is shown to have such limitations. Humans make use of other image cues, such as hairstyles, body shape, and dress codes, for determining the gender.

The present invention proposes a method that makes use of both the parts-based image features and global geometry-based features for an accurate recognition of gender. Both the global-level face localization method and the feature-level localization method have been designed as crucial components of the approach. The face localization method aligns the global shapes of the faces. It also provides approximate facial feature locations that provide a basis for more refined facial feature localization. The appearance of the localized facial features are then extracted, along with the global facial geometry features, to form a feature vector to effectively represent the gender-sensitive image feature of a given face. The present invention also extracts and makes use of non-facial features to be added to the gender-sensitive feature vector. The hairstyle is segmented out from facial images based on an involved analysis: the facial skin and hair tone pixels are sampled based on the accurate localization of faces and on the skin-hair tone discriminant analysis, using a large number of skin tone and hair tone samples. The actual recognition task is carried out by training a learning machine on the collected gender-sensitive feature vectors. The face localization and facial feature localization both involve training images annotated with facial feature locations; the face localization assumes roughly detected facial regions from the face detection step, and facial feature localization assumes corrected facial images using face localization. Both sets of training data are prepared based on these assumptions.

There have been prior attempts for detecting human faces in still images or in videos.

U.S. Pat. No. 6,829,384 of Schneiderman, et al. (hereinafter Schneiderman) disclosed an object finder program for detecting the presence of a three-dimensional object in a two-dimensional image containing a two-dimensional representation of the three-dimensional object. The object finder uses the wavelet transform of the input two-dimensional image for object detection. A preselected number of view-based detectors are trained on sample images prior to performing the detection on an unknown image. These detectors then operate on the given input image and compute a quantized wavelet transform for the entire input image. Object detection then proceeds with a sampling of the quantized wavelet coefficients at different image window locations on the input image, and efficient look-up of precomputed log-likelihood tables to determine object presence. The object finder's coarse-to-fine object detection strategy coupled with exhaustive object search across different positions and scales results in an efficient and accurate object detection scheme.

U.S. Pat. No. 7,031,499 of Viola, et al. (hereinafter Viola) disclosed an object detection system for detecting instances of an object in a digital image using an image integrator and an object detector, which includes a classifier (classification function) and an image scanner. The image integrator receives an input image and calculates an integral image representation of the input image. The image scanner scans the image in same sized subwindows. The object detector uses a cascade of homogeneous classification functions or classifiers to classify the subwindows as to whether each subwindow is likely to contain an instance of the object. Each classifier evaluates one or more features of the object to determine the presence of such features in a subwindow that would indicate the likelihood of an instance of the object in the subwindow.

The disclosed method assumes that a stream of detected faces are fed to the system, where face detection is performed by a machine learning based face detection method, similar to the method disclosed in Viola and Schneiderman.

There have been prior attempts for detecting and localizing facial features from facial images for the purpose of further facial image analysis.

U.S. Pat. No. 5,781,650 of Lobo, et al. (hereinafter Lobo) disclosed a method for automatically finding facial images of a human face in a digital image, and classifying the age of the person into an age category. Step 1 of the process is to find facial features of the digital image encompassing the chin, sides of the face, and the virtual top of the head, eyes, mouth and nose of the image. Step 2 is to compute the facial feature ratios of the facial features found in Step 1. Step 3 is to compute a wrinkle analysis of the image. Step 4 is to combine the previous two steps to categorize the age of the facial image. The invention can locate and detect facial images for age classification from digital camera images and computerized generated images.

U.S. Pat. No. 5,852,669 of Eleftheriadis, et al. (hereinafter Eleftheriadis) disclosed a method that responds to a video signal representing a succession of frames, where at least one of the frames corresponds to an image of an object, to detect at least a region of the object. The method includes a processor for processing the video signal to detect at least the region of the object characterized by at least a portion of a closed curve and to generate a plurality of parameters associated with the closed curve for use in coding the video signal.

U.S. Pat. No. 6,219,639 of Bakis, et al. (hereinafter Bakis) disclosed a method for recognizing an individual based on attributes associated with the individual comprising the steps of: pre-storing at least two distinctive attributes of the individual during at least one enrollment session; contemporaneously extracting the at least two distinctive attributes from the individual during a common recognition session; segmenting the pre-stored attributes and the extracted attributes according to a sequence of segmentation units; indexing the segmented pre-stored and extracted attributes so that the segmented pre-stored and extracted attributes corresponding to an identical segmentation unit in the sequence of segmentation units are associated to an identical index; and respectively comparing the segmented pre-stored and extracted attributes associated to the identical index to each other to recognize the individual.

U.S. Pat. No. 7,058,209 of Chen, et al. (hereinafter Chen) disclosed a digital image processing method that detects facial features in a digital image. This method includes the steps of detecting iris pixels in the image, clustering the iris pixels, and selecting at least one of the following schemes to identify eye positions: applying geometric reasoning to detect eye positions using the iris pixel clusters; applying a summation of squared difference method using the iris pixel clusters to detect eye positions; and applying a summation of squared difference method to detect eye positions from the pixels in the image. The method applied to identify eye positions is selected on the basis of the number of iris pixel clusters, and the facial features are located using the identified eye positions.

U.S. Pat. Appl. Pub. No. 2005/0041867 of Loy, et al. (hereinafter Loy) disclosed a method of utilizing a computer system to automatically detect the location of a face within a series of images, the method comprising the steps of: detecting eye like regions within the series of images; utilizing the eye like regions to extract potential face regions within the series of images; enhancing the facial features in the extracted potential face regions; classifying the features; and verifying the face topology within the potential face regions.

In Lobo, the facial feature detection is performed under close range high-resolution frontal face images to extract features for age classification. In Eleftheriadis, the face facial feature detection is used for image compression, by employing edge and model-based scheme. In Bakis, the lip contour registration is performed for the purpose of multi-modal speaker recognition or verification. In Chen, eyes are detected and localized in a human face, based on the iris color signature and the cluster analysis of the iris color pixels. In Loy, eye candidates are detected first using geometric model of eye images. Based on the eye candidate locations, the facial region is detected, and other facial regions are detected and verified using geometric reasoning (facial features topology).

In all of the mentioned prior inventions, either high resolution facial images or good quality color facial images are required to reliably detect facial features. The success of these approaches also depends on successful face detection or initial (mostly eyes) features detection. In the proposed invention, the robust facial localization based on a large number of samples is performed after machine learning-based face detection. The facial features are accurately localized within already roughly localized facial feature windows, again using learning machines trained to localize only each given facial feature. The present method does not require high-resolution images or color information; it works with either gray-level or color images, and works under various imaging conditions due to the training with a large number of images taken under various imaging conditions.

There have been prior attempts for analyzing the skin tone of humans for the purpose of segmenting out facial or skin regions.

U.S. Pat. No. 5,488,429 of Kojima, et al. (hereinafter Kojima) disclosed a method where a flesh-tone area is detected based on color-difference and luminance signals constituting video signals, and luminance correction and color correction. Aperture corrections are performed only on the flesh-tone area or a human face area identified in the flesh-tone area. The setting of a focus area or the setting of a photometric area for iris control, automatic gain control, automatic shutter control, etc., in a video camera, is performed with respect to the flesh-tone area or the human face area. Furthermore, based on the color-difference and luminance signals constituting the video signals, a background area is detected, and the video signals are divided into components representing a background area and components representing an object area. An image signal of a desired hue or a still image is superimposed on the detected background area, or special processing is performed on the video signals representing the object area other than the detected background area.

U.S. Pat. No. 6,711,286 of Chen, et al. (hereinafter Chen-1) disclosed a computer vision/image processing method of removing blond hair color pixels in digital image skin detection for a variety of imaging related applications, such as redeye defects detection. It employs a combination of skin detectors operating in a generalized RGB space in combination with a hue space derived from the original image space to detect skin pixels and blond hair pixels within the skin pixels.

U.S. Pat. No. 6,690,822 of Chen, et al. (hereinafter Chen-2) disclosed a method for detecting skin color in a digital image having pixels in an RGB color space. The method generally includes the steps of performing statistical analysis of the digital color image to determine the mean RGB color values; then, if the mean value of any one of the colors is below a predetermined threshold, applying a transformation to the digital image to move skin colors in the image toward a predetermined region of the color space; and employing the transformed space to locate the skin color pixels in the digital color image. More specifically, if the mean value of any one of the colors is below a predetermined threshold, a non-linear transformation is applied to the digital image to move skin colors in the image toward a predetermined region of the color space. Then, depending on the preceding step, either the digital image or the transformed digital image is converted from the RGB space to a generalized RGB space to produce a gRGB digital image; skin color pixels are detected.

U.S. Pat. Appl. Pub. No. 2006/0066912 of Kagaya (hereinafter Kagaya) disclosed a method for skin tone detection, where skin tone image portion contained in an image is detected based upon the shape of the image of a human face. An average value of each of RGB values of pixels that constitute the skin tone image portion detected is calculated. If the distance between a skin tone-blackbody locus and a value that is the result of converting the RGB values obtained by multiplying the average value by prescribed coefficients is less than a prescribed value, these coefficients are adopted as coefficients for multiplying the RGB values of each pixel constituting the image. By using a value that is the result of conversion to a chromaticity value, the RGB values obtained by multiplying the RGB values of each of the pixels constituting the image by the prescribed coefficients, those pixels of the image that have values belonging to a zone in the vicinity of a point on a gray-blackbody locus that corresponds to a light-source color temperature estimated based upon the skin tone-blackbody locus are treated as gray candidate pixels.

Kojima, Chen-1, Chen-2, and Kagaya all aim to separate out the skin tone region in color space using various color space and color space transforms. We use a similar scheme to detect skin tone, utilizing a combination of both linear and nonlinear mapping in color space. In Chen-1, the method explicitly uses hue-based blonde hair tone removal, to segment facial the skin tone region that doesn't have the blonde hair region. In the present invention, the separation of skin tone and hair tone (which include all human hair tones, not just blonde) is carried out using the linear discriminant analysis on sampled skin and hair tones.

There have been prior attempts for recognizing the gender (or more generally, demographics) category of a person by processing facial images.

U.S. Pat. No. 6,990,217 of Moghaddam, et al. (hereinafter Moghaddam) disclosed a method to employ Support Vector Machines (SVMs) to classify images of faces according to gender, by training the images, including images of male and female faces; determining a plurality of support vectors from the training images for identifying a hyperplane for the gender decision; and reducing the resolution of the training images and the test image by subsampling before supplying the images to the Support Vector Machine.

U.S. patent application Ser. No. 10/972,316 of Agrawal, et al. (hereinafter Agrawal) disclosed a system and method for automatically extracting the demographic information from images. The system detects the face in an image, locates different components, extracts component features, and then classifies the components to identify the age, gender, or ethnicity of the person(s) in the image. Using components for demographic classification gives better results as compared to currently known techniques. Moreover, the described system and technique can be used to extract demographic information in a more robust manner than currently known methods in environments where a high degree of variability in size, shape, color, texture, pose, and occlusion exists. This invention also performs classifier fusion using Data Level fusion and Multi-level classification for fusing results of various component demographic classifiers. Besides use as an automated data collection system wherein, given the necessary facial information as the data, the demographic category of the person is determined automatically, the system could also be used for the targeting of advertisements, surveillance, human computer interaction, security enhancements, immersive computer games, and improving user interfaces based on demographic information.

U.S. patent application Ser. No. 11/811,614 of Moon, et al. (hereinafter Moon) disclosed a face-based automatic demographics classification system that is robust to pose changes of the target faces and to accidental scene variables, such as noise, lighting, and occlusion, by using a pose-independent facial image representation which is comprised of multiple pose-dependent facial appearance models. Given a sequence of people's faces in a scene, the two-dimensional variations, such as position error, size, and in-plane orientation, are estimated and corrected using a novel machine learning based method. The system also estimates the three-dimensional pose of the people, using a conceptually similar machine learning based approach. Then the face tracking module keeps the identity of the person using geometric and appearance cues of the person, where multiple appearance models are built based on the poses of the faces. The separate processing of each pose makes the appearance model building more accurate so that the tracking performance becomes more accurate. Each separately built pose-dependent facial appearance model is fed to the demographics classifier, which is again trained using only the faces having the corresponding pose. The classification scores from the set of pose-dependent classifiers are aggregated to determine the final face category, such as gender, age, and ethnicity of the person, etc.

"A Method of Gender Classification by Integrating Facial, Hairstyle, and Clothing Images," in the Proceedings of the 17th International Conference on Pattern Recognition, 2004, by Ueki, et al. (hereinafter Ueki) disclosed a method of gender classification by integrating facial, hairstyle, and clothing images. Initially, input images are separated into facial, hairstyle and clothing regions, and independently learned PCAs and GMMs based on thousands of sample images are applied to each region. The classification results are then integrated into a single score using some known priors based on the Bayes rule. Experimental results showed that our integration strategy significantly reduced the error rate in gender classification compared with the conventional facial only approach.

The approach by Moghaddam addresses the problem of gender recognition by training an SVM using a large number of image instances to make use of image features that distinguish male from female. However, it uses a holistic image, which implicitly contains both the shape and geometric features, while the present invention decouples the shape and geometry information so that the separated information can be compared explicitly. In Agrawal, the gender recognition (or demographics recognition in general) is based on comparing individual features, consisting of the indexed and localized feature images and their relative positions. The present invention takes very similar approaches. However, Agrawal does not suggest any automated means for detecting and localizing facial features. The present invention makes use of both automatic face localization and automatic facial feature localization so that the whole process of face detection, localization, facial feature detection and localization, and feature extraction can be performed without any human intervention. On the other hand, the present invention makes use of hairstyle information, which provides very a useful clue for gender recognition, also by performing automated hair-skin separation based on color space analysis. In Moon, a series of geometric estimation for face localization, three-dimensional facial pose estimation, and face tracking and appearance model building are performed to conduct pose-independent demographics classification; the approach focuses more on dealing with pose and depends on using a holistic facial appearance model. While the present invention performs face localization similar to Moon, it also performs explicit facial feature localization to decouple facial feature geometry and facial feature appearance to achieve accurate gender recognition. In Ueki, the gender-specific dress code and hairstyle are exploited for gender recognition, in addition to facial image features. The use of hair features is shared by the present invention. However, in Ueki, the hairstyle extraction is simplified and based on gray-level images due to the dark complexion of the specific ethnicity group, while in the present invention the hair region segmentation can deal with any kinds of skin tone and hair color.

In summary, the present invention provides a fully automatic face localization, facial feature localization, and feature extraction approach, for accurate facial feature-based gender recognition, unlike some of the approaches that use manually extracted features. The facial feature localization approach is different from the prior approach in that it uses multiple learning machines, each tuned to specific geometry of facial features, and can robustly detect and localize facial features under harsh imaging conditions. The basic approach is different from most demographics classification approaches in that the recognition is based on separate geometric and appearance features. It also makes use of automatically extracted hairstyle information using skin tone-hair tone discriminant analysis, which is very specific to gender recognition.

SUMMARY

The present invention is a method and system for a face-based automatic gender recognition system that utilizes localized facial and non-facial image features of humans.

It is one of the objectives of the first step of the processing to annotate facial feature landmark points, hair regions (boundaries or pixels), and gender labels of the facial images in the facial image database. The step involves human operators each examining facial images one at a time, marking the predetermined landmark points that delimit the facial features, and recording the perceived gender label of the face. The hair region annotation can either sample the hair tone pixels or mark the boundary of the hair region. The step typically utilizes graphical user interface software for browsing through images, marking the points or boundaries on the images, and registering the coordinates of the marked points.

It is one of the objectives of the second step of the processing to train the face localization machines, the facial feature localization machines, and the skin-hair tone discriminant projection. The face localization training requires facial images having varied two-dimensional geometry—(X, Y) shifts, sizes S, and orientations O—that reflect the variations from the face detection step, along with the ground-truth values of these variations. Multiple learning machines are trained, where each machine is trained to output high response to facial images having (X, Y, S, O) close to the predetermined (X0, Y0, S0, O0) of the machine. The facial feature localization training proceeds in the same way, so that multiple learning machines are prepared and trained for each facial feature. The skin-hair discriminant projection training aims to find the direction (called skin-hair discriminant axis) in color space that best separates the skin tone and hair tone. The collected skin tone and hair tone pixels form clusters in color space, and linear discriminant analysis is performed to find the discriminant axis.

It is one of the objectives of the third step of the processing to detect and localize faces in given images, and localize facial features. A detected face in a given image has a bounding box around the face that approximately delimits its position and size. The image inside the bounding box is cropped, rescaled to a standard size (for example, 30×30), and fed to the face localization machines. The face localization machines estimate the geometry in cooperation, and the facial image is localized based on these estimates. The facial feature images are cropped from the localized facial image, according to the placements of the standard feature windows. The facial feature localization machines estimate the position, size, and orientation variations of the facial features inside the standard feature windows.

It is one of the objectives of the fourth step of the processing to extract geometric, appearance, and hairstyle features. The geometric features are simply the position and size variations of the facial features against the standard positions and sizes. The appearance features are the extracted facial feature images after the position, size, and orientation are adjusted using the estimated feature image variations. In another exemplary embodiment, the geometric feature can simply make use of the responses from the facial feature localization machines, instead of using the estimated positions and sizes. The hairstyle feature is extracted based on the histogram analysis of skin tone and hair tone pixels, where the pixels are parameterized by (distance_from_face_center, skin_hair_discriminant_projection). The segmented hair region is reduced to a standard size, and binarized to be added to the gender-sensitive feature vector. These features (geometric, appearance, and hairstyle) constitute the gender-sensitive feature vector of the given facial image.

It is one of the objectives of the fifth step of the processing to train the demographics recognition machine using the gender-sensitive feature vectors extracted from the facial images and the corresponding ground-truth gender labels. The training algorithm depends on the kind of learning machine architecture that the system employs. Any supervised learning machine types, such as SVM or Neural Network, can be used for this purpose.

It is one of the objectives of the sixth step of the processing to process a detected face to localize the face, localize the facial features, segment the hair region, extract the gender-sensitive feature vector, and feed the feature vector to the trained gender recognition machine to determine its gender. The present invention can process any images potentially containing faces, whether they are video sequences or standalone photos.

DRAWINGS

Figures

DETAILED DESCRIPTION OF THE INVENTION

Figure 1:
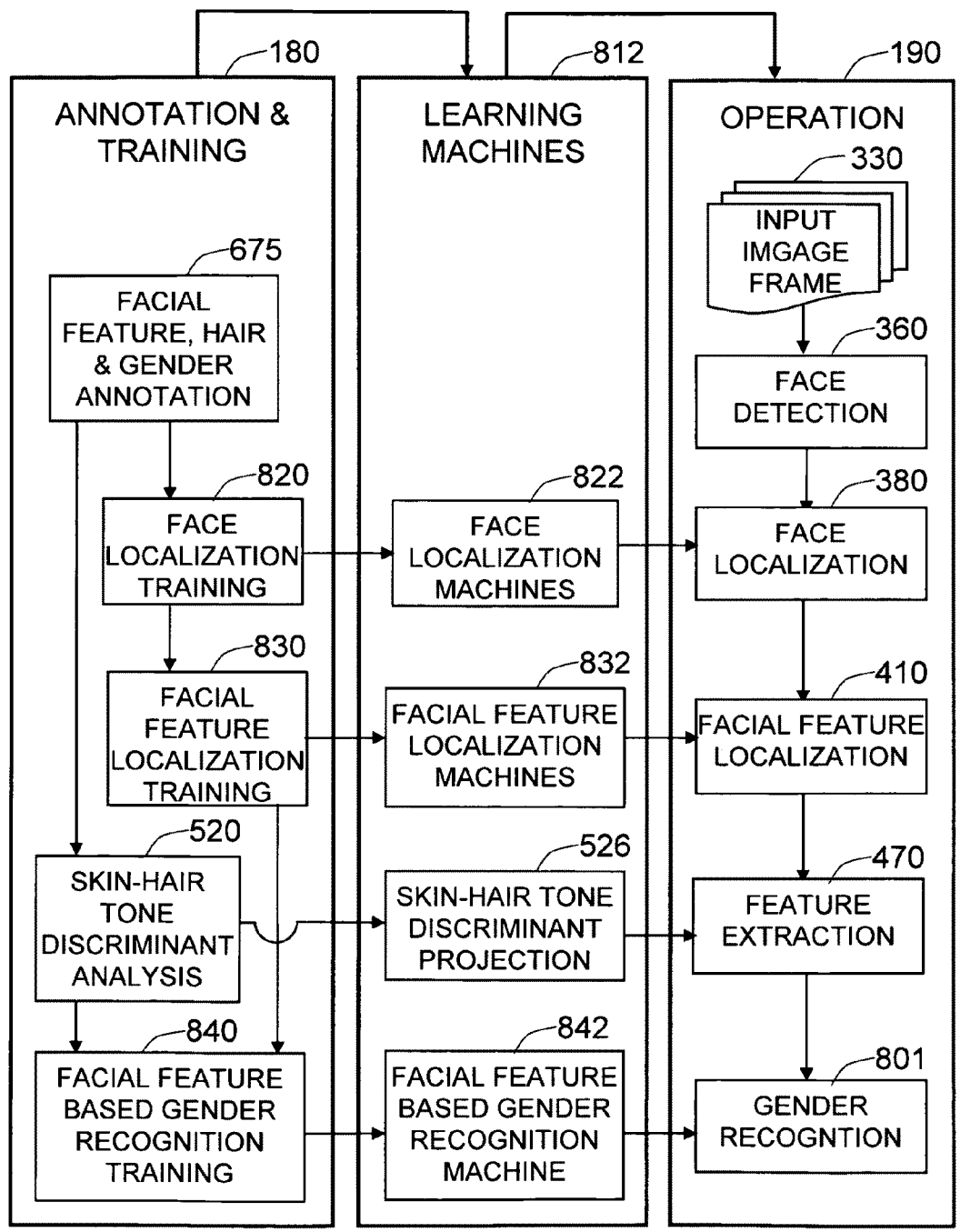
FIG. 1 is an overall scheme of the system in a preferred embodiment of the invention.

FIG. 1 is an overall scheme of the system in a preferred embodiment of the invention. The highest-level system elements are: 1. Annotation & training 180. 2. The learning machines 812 that are generated from the annotation & training 180 step. 3. The actual operation 190 step where the trained learning machines 812 are used in appropriate steps.

In annotation & training 180, facial image database is annotated first. The facial feature, hair, and gender annotation 675 step serves multiple purposes; it provides training data to face localization training 820, facial feature localization training 830, skin-hair tone discriminant analysis 520, and facial feature-based gender recognition training 840. Once all four trainings are complete, face localization machines 822, facial feature localization machines 832, skin-hair tone discriminant projection 526, and a facial feature-based gender recognition machine 842 are generated. At this point, the system is able to perform actual operation 190. Given any input image frame 330 that potentially contains human faces, the face detection 360 step detects any human face, and places a bounding box (called a face detection window) at each detected face that approximates the size and the position of the face. Using the trained face localization machines 822, the face localization 380 step then computes the (X,Y) shift, size variation, and orientation of the face inside the face detection window. Employing the trained facial feature localization machines 832, the facial feature localization 410 step then finds the accurate positions and boundaries of the facial features, such as eyes, eyebrows, nose, mouth, etc., based on the previously computed location, size, and orientation of the face. The skin-hair tone discriminant projection 842 then helps to segment out the hairstyle feature of the face. The geometric and appearance feature (including the hairstyle feature) of the face are then extracted from the facial image in the feature extraction 470 step, to construct the gender-sensitive feature vector. The trained facial feature-based gender recognition machine 842 determines the gender of the face in the gender recognition 801 step.

Figure 2:
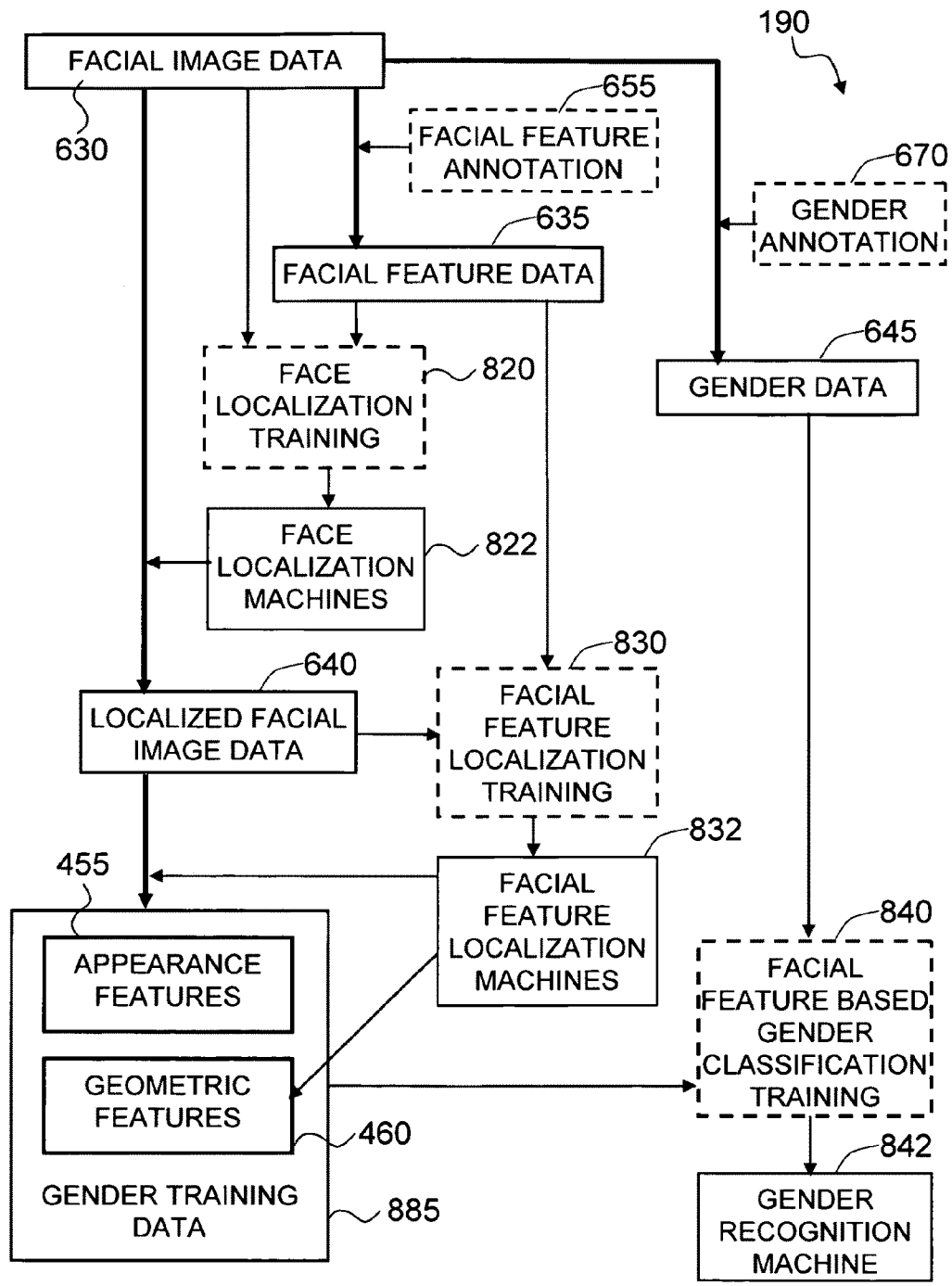
FIG. 2 shows an overview of the annotation & training in an exemplary embodiment of the present invention.

FIG. 2 shows an overview of the annotation & training 190 in an exemplary embodiment of the present invention. The skin-hair tone discriminant analysis 520 is not included in this diagram, because it can be performed independent of other steps in the annotation & training 190. It illustrates how the facial image data is annotated and used to train learning machines, and how the trained learning machine then processes the original facial image data to generate training data for the later steps in the system, and so on.

First, the facial feature annotation 655 generates the facial feature data 635, which consists of the locations of the predetermined landmark points of each facial feature of the facial image. Human annotators typically carry out the annotation task, and the output is the set of two-dimensional coordinates of the landmark points indexed by the facial features and the faces. The gender annotation 670 similarly generates the gender data 645 consisting of the gender labels indexed by the faces.

The facial image data 630 along with the facial feature data 655 serves as the training data for face localization training 820, because the facial feature data also reveal the global geometry of the facial image. The products of the face localization training 820 are the face localization machines 822. The facial image data are then fed to the face localization machines 822, without the knowledge of the annotated facial geometry, to generate the localized facial image data 640.

The localized facial image data 640 still have some degree of variations in individual facial feature sizes and locations due to personal differences and errors from face localization. The localized facial image data 640 along with the facial feature data 635 make up the training data for facial feature localization training 830. The facial feature localization machines 832 are the products of this training step.

The trained facial feature localization machines 832 then process the localized facial image data, without the knowledge of the annotated facial feature data, to estimate the sizes and positions of the facial features. These facial feature geometries are then used to extract the appearance features 455 of all the facial features of the face, and also are simply turned to the geometric features 460 of the face.

The extracted appearance features 455 and geometric features 460 constitute the gender-sensitive feature vector. The set of gender-sensitive feature vectors, along with the gender data, serves as the gender training data 885; these data are used in facial feature-based gender recognition training 840 to finally produce the gender classification machine 842.

Figure 3:
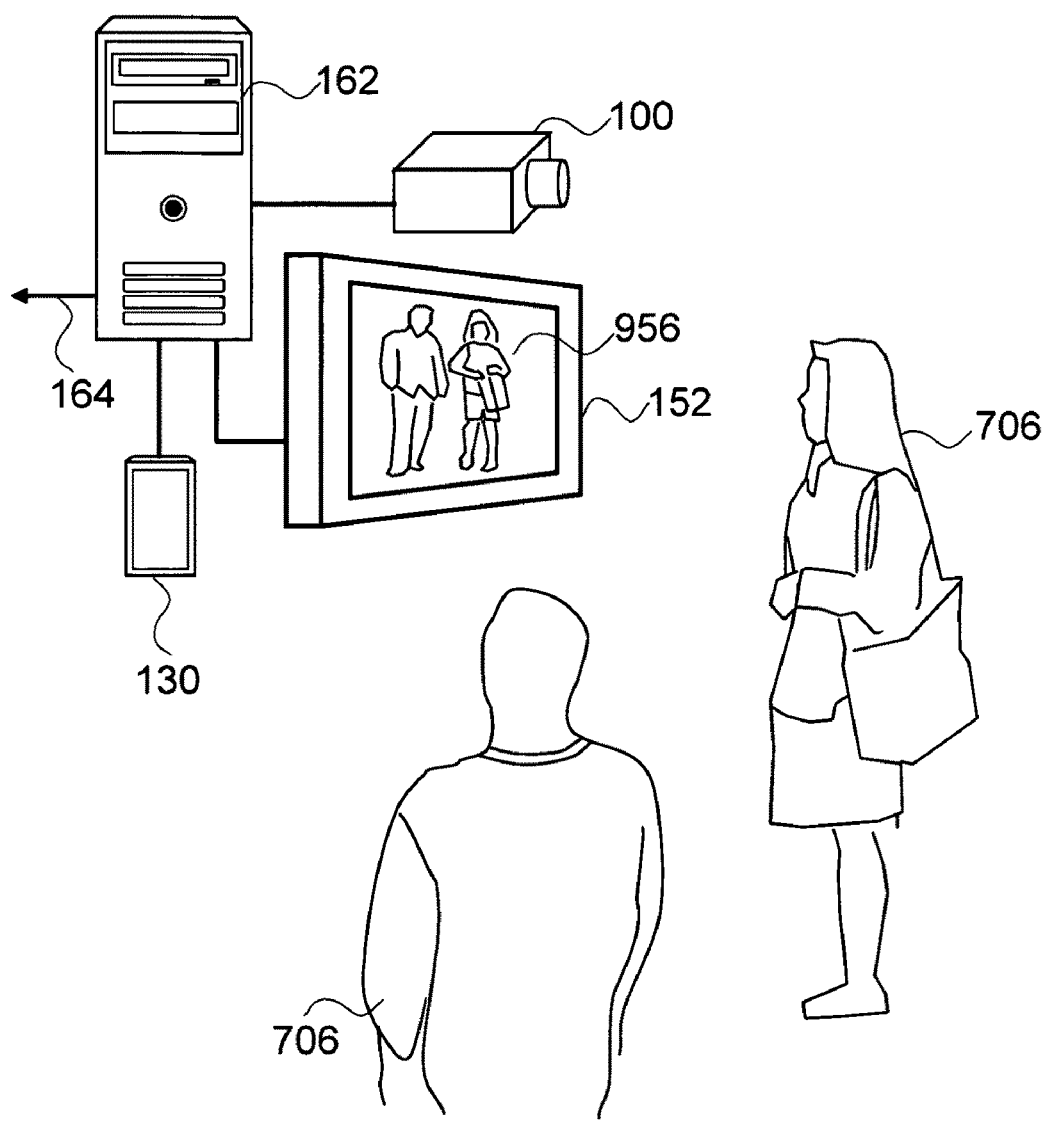
FIG. 3 shows a view of the system of the invention in, an operational environment in an exemplary embodiment.

FIG. 3 shows a view of the system of the invention in an operational environment in an exemplary embodiment. The means for capturing images 100 is connected to a control and processing system 162 via analog, USB, Firewire, Ethernet, or wireless connection. The position, orientation, and the field of view of the means for capturing images 100 are determined to maximize the coverage of the target person 706. The means for capturing images 100 captures the facial images of a target person 706 and sends them to the control and processing system 162, which holds most of the processing and generates the data. The output data is stored to an internal or external storage 130 or transmitted to a network using a network connection 164. In this exemplary embodiment, the media content 956 of the display 152 can be switched based on the recognized gender of the person near the display 152 or the gender composition of the people near the display 152.

Figure 4:
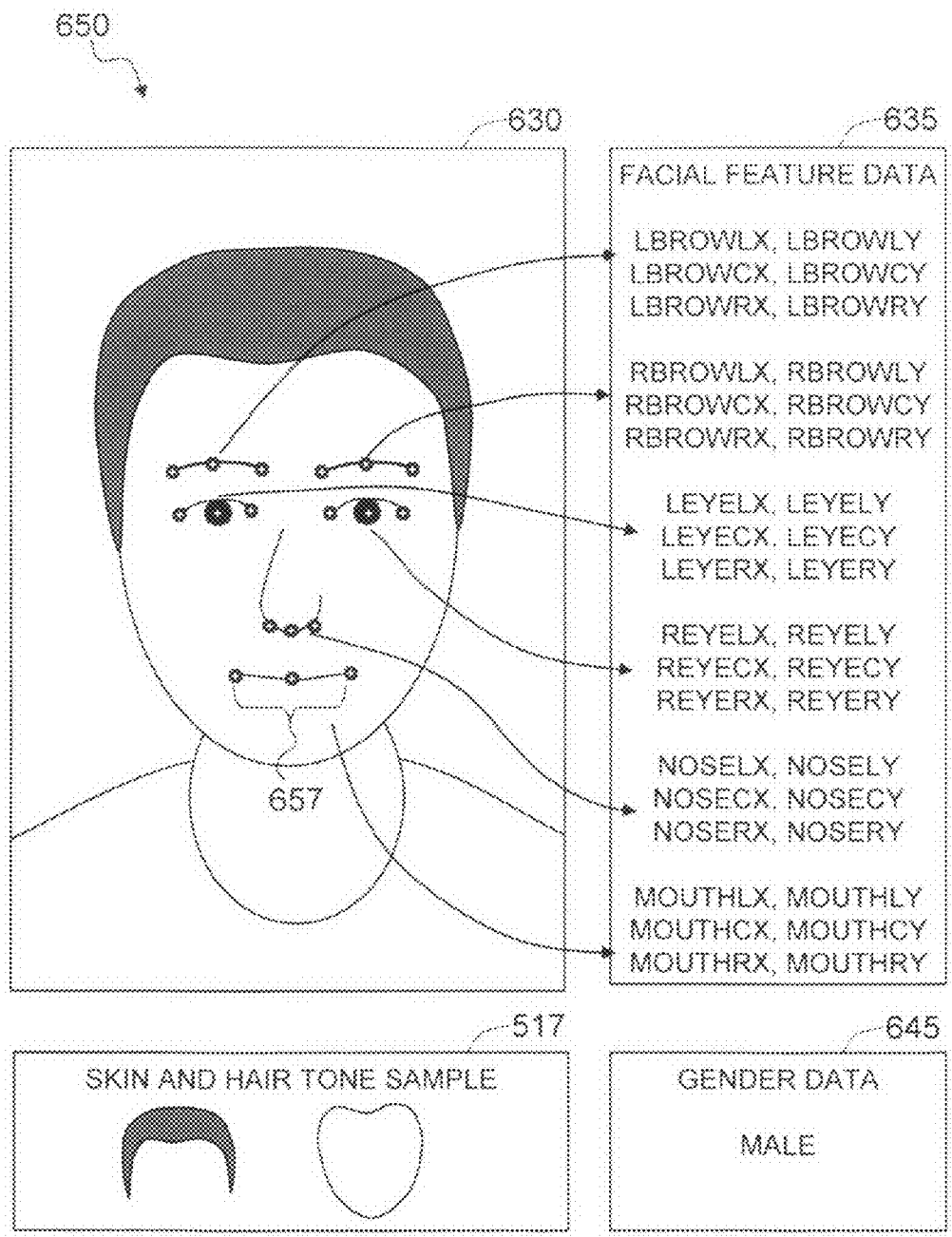
FIG. 4 shows an exemplary embodiment of the facial feature, hair, and gender annotation step.

FIG. 4 shows an exemplary embodiment of the facial feature, hair, and gender annotation 650 step. The facial feature annotation 655 step identifies each facial feature and marks facial feature landmark points 657 that delimit the given facial feature. The landmark points are determined beforehand; in the exemplary embodiment shown in the FIG. 4, three positions are chosen as representing the geometry of each facial feature—the left end (or left corner), the center, and the right end (or right corner). Six facial features—left eyebrow, right eyebrow, left eye, right eye, nose, and mouth—are used in the embodiment. Therefore, a total of 6×3=18 landmark positions are marked, and the (X, Y) image coordinates of the indexed (or ordered) landmark points constitute the facial feature data 635 of each face.

The gender data 645 is simply the gender label of the face from the possible set of genders: male or female.

The skin and hair tone pixels are collected in the hair annotation 655 step, to generate skin and hair tone sample 517. Subsets of pixels, each belonging to the hair region or face, can be directly sampled and recorded, or the boundary points of the hair region and facial skin tone region can be marked so that the pixels inside the boundary can be sampled in later stages.

Figure 5:
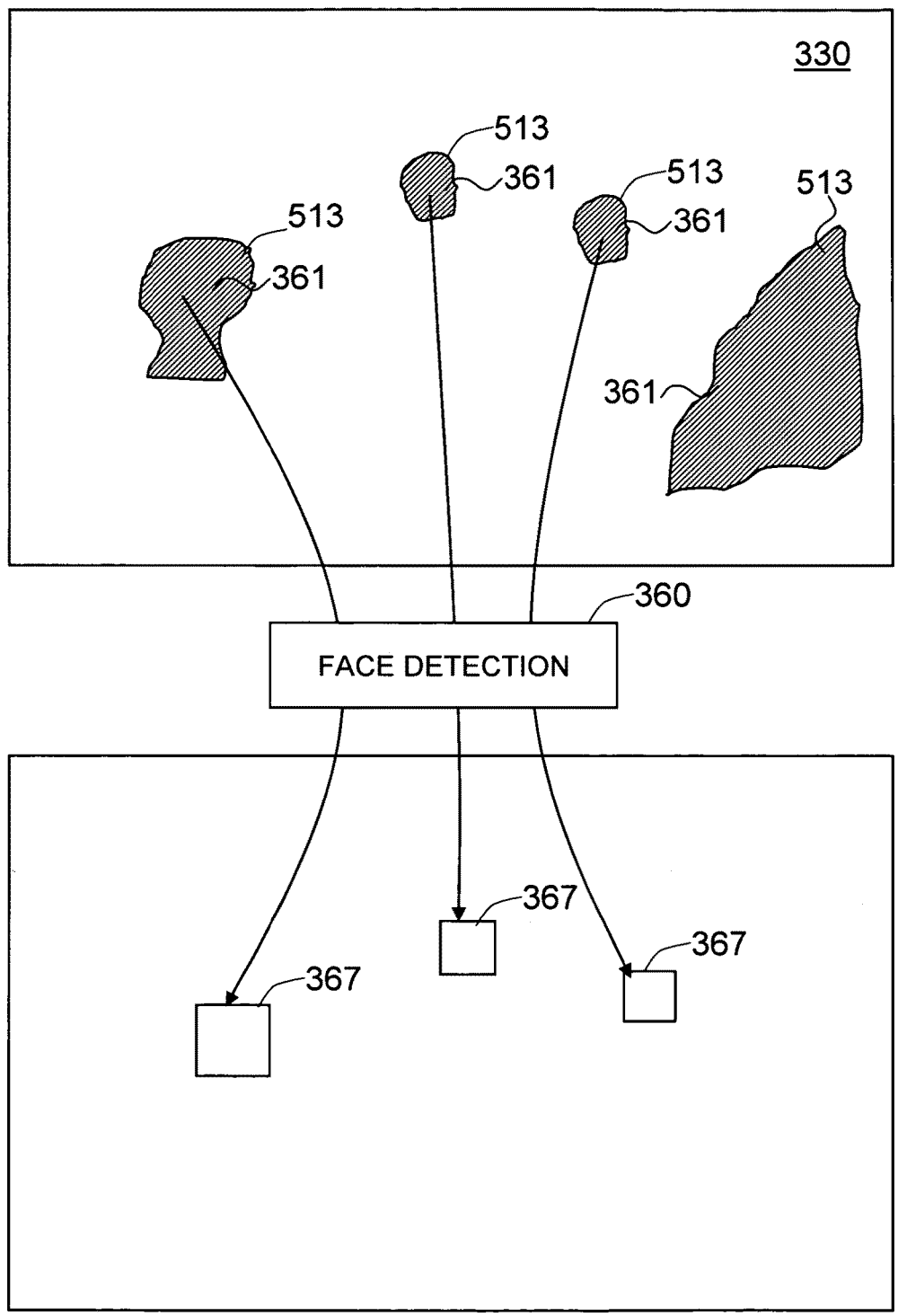
FIG. 5 shows the face detection scheme in an exemplary embodiment of the present invention.

FIG. 5 shows the face detection 360 scheme in an exemplary embodiment of the present invention. Skin tone detection is performed in an input image frame 330, to limit the search space for face detection 360, and at the same time to reduce the falsely detected faces. The skin tone detection utilizes color information to find regions in the input image frame where the human faces are likely to be present. In the exemplary embodiment, the skin tone region 513 serves as the face detection region 361. Any image-based face detection algorithm can be used to detect human faces in the face detection region 361. Typically, a machine learning-based face detection algorithm is employed. The face detection algorithm produces face windows 367 that correspond to the locations and the sizes of the detected faces.

Figure 6:
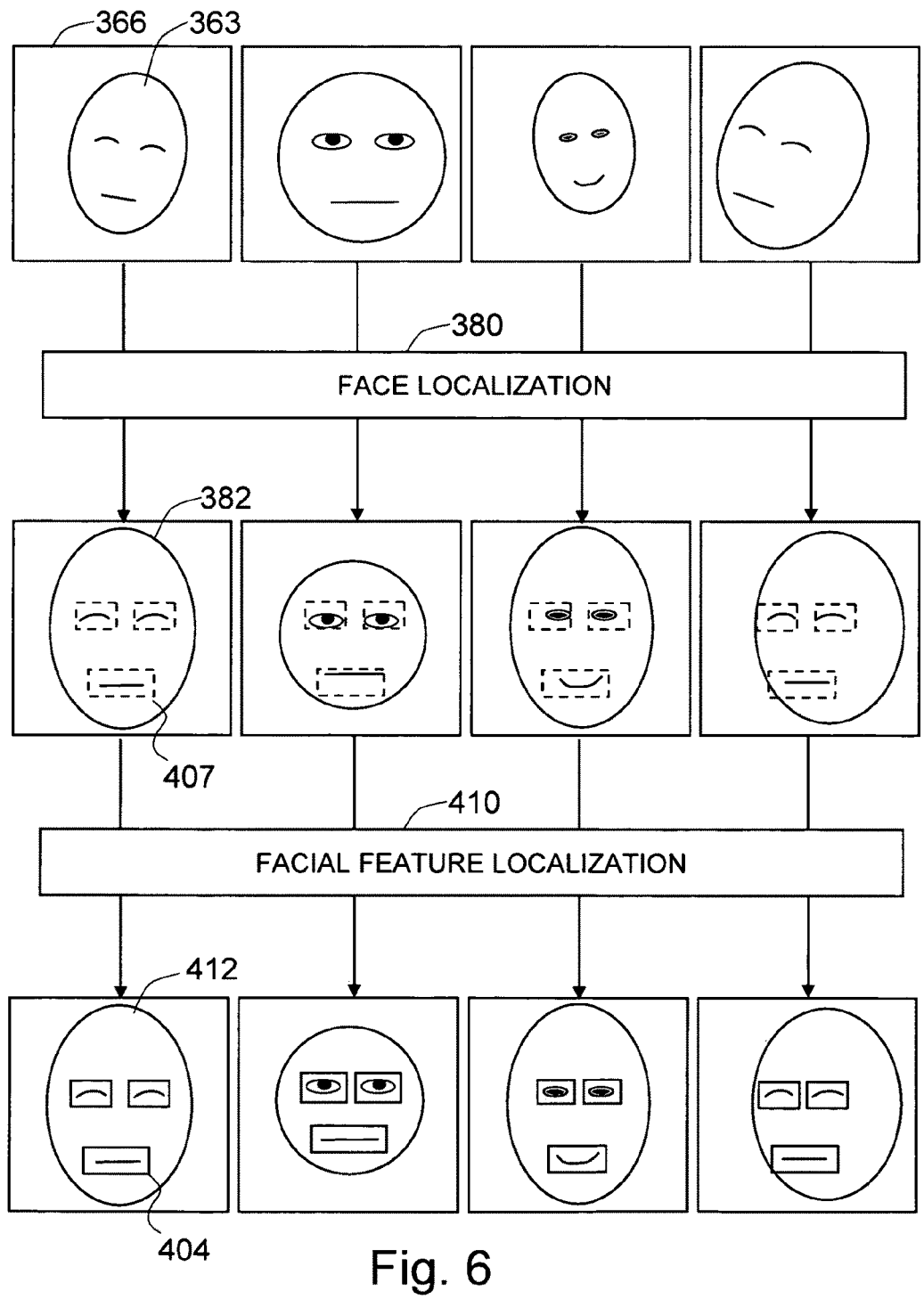
FIG. 6 shows a functional overview of the face localization step and facial feature localization step.

FIG. 6 shows a functional overview of the face localization 380 step and the facial feature localization 410 step. The detected facial image should be normalized before it can be further processed by the facial feature localization 410 step to extract features for discriminating gender. In an exemplary embodiment, the facial images are aligned so that the respective facial features (eyes, mouths) are approximately aligned. First the two-dimensional facial pose is estimated. The detected face 363 has varied position (X, Y) within the face window 366, and also has varied size S and orientation O. The two-dimensional pose (X, Y, S, O) is estimated using face localization machines. Given the estimated (X, Y, S, O), the detected face 363 is shifted, resized, and rotated so that the positions of the facial features are approximately aligned to the standard feature positions; the transformed face is called the localized face 382. However, due to personal differences in global arrangement of facial features, facial feature locations have some variations even after face localization. On the other hand, face localization has estimation errors that translate into errors in facial feature positions. More accurate feature locations are estimated in the next facial feature localization 410 step.

FIG. 6 also shows that the facial feature locations in the localized face 382 are somewhat varied within the standard feature windows 407 (marked by the dashed rectangles). The facial feature localization 410 step correctly estimates the locations and sizes of the facial features in the facial feature localized face 412.

Figure 7:
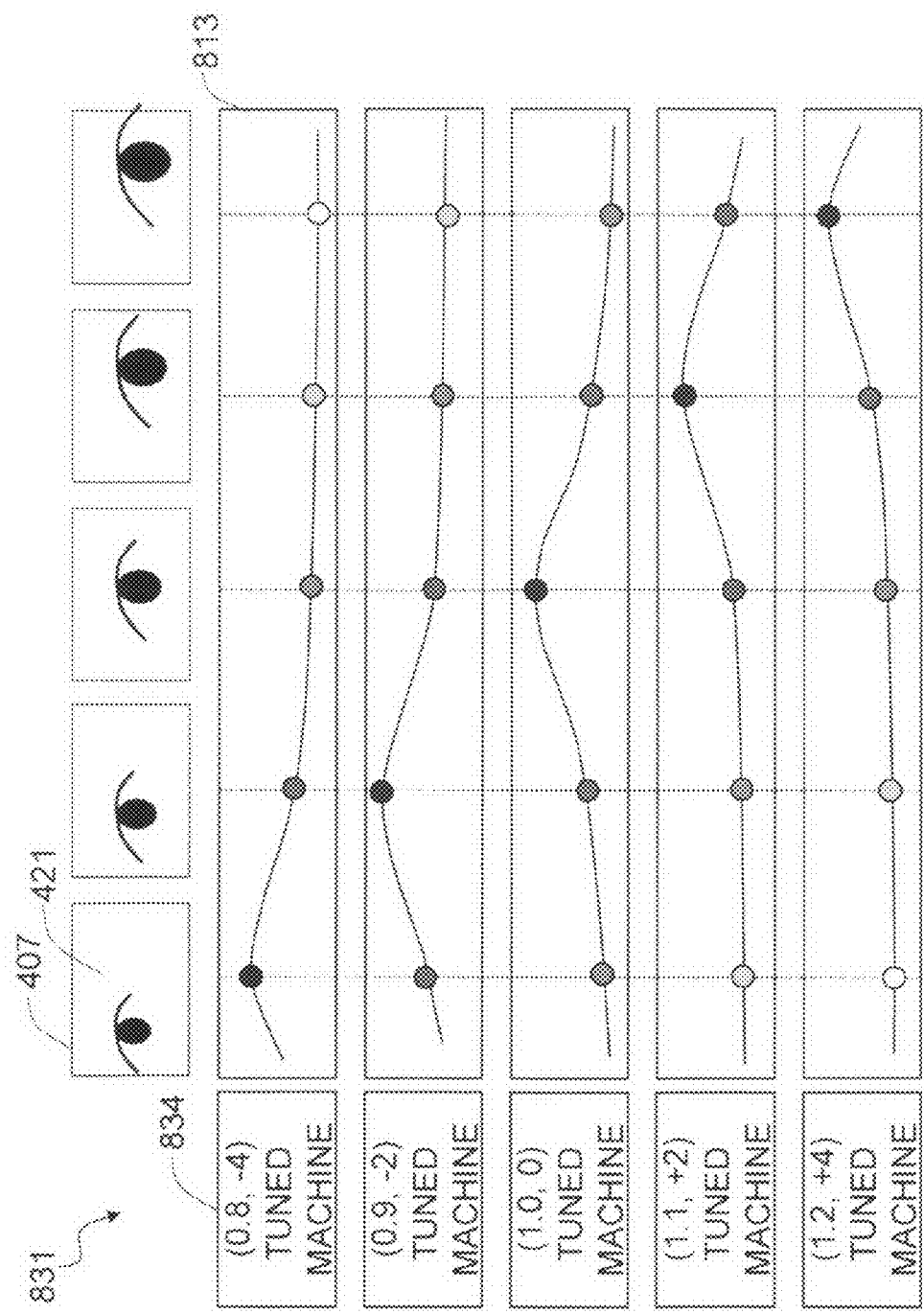
FIG. 7 illustrates the response profile that each machine is trained to learn.

FIG. 7 shows a facial feature localization training scheme 831 in an exemplary embodiment of the present invention. This exemplary training scheme aims to estimate the x (horizontal) shift, y (vertical) shift, the scale, and the orientation of the right eye.

The training eye images are generated by cropping the standard right eye region from the localized faces. The facial landmark points of the face have been already annotated in the facial feature annotation 655 step, and the coordinates of the landmark points after going through the face localization are available. In this exemplary embodiment, multiple learning machines are employed to estimate the x-location and the scale of the right eye, where each machine is tuned to a specific (x-shift, scale) pair.

Given an input right eye image 421, the machine having the inherent geometry of (x0, y0, s0, o0) is trained to output the likelihood of the eye image 421 having the inherent geometry. If the input training eye has the (ex, ey, es, eo), then the target output is the Gaussian likelihood: $L=\mathrm{Exp}(-(ex-x0)/kx-(ey-y0)/ky-(es-s0)/ks-(eo-o0)/ko)$. kx, ky, ks, and ko are constants determined empirically. (ex, ey, es, eo) can be easily determined beforehand using the coordinates of the landmark points relative to the standard facial feature positions and sizes.

Each plot in the FIG. 7 illustrates the responses 813 profile that each machine is trained to learn. Each machine is trained to produce a peak for the eye image 421 having the corresponding geometry, and to produce gradually lower values as the geometry changes from the inherent geometry of the machine. The figure is shown only for the two dimensions (x, s)=(x-shift, scale) for the purpose of clear presentation.

Figure 8:
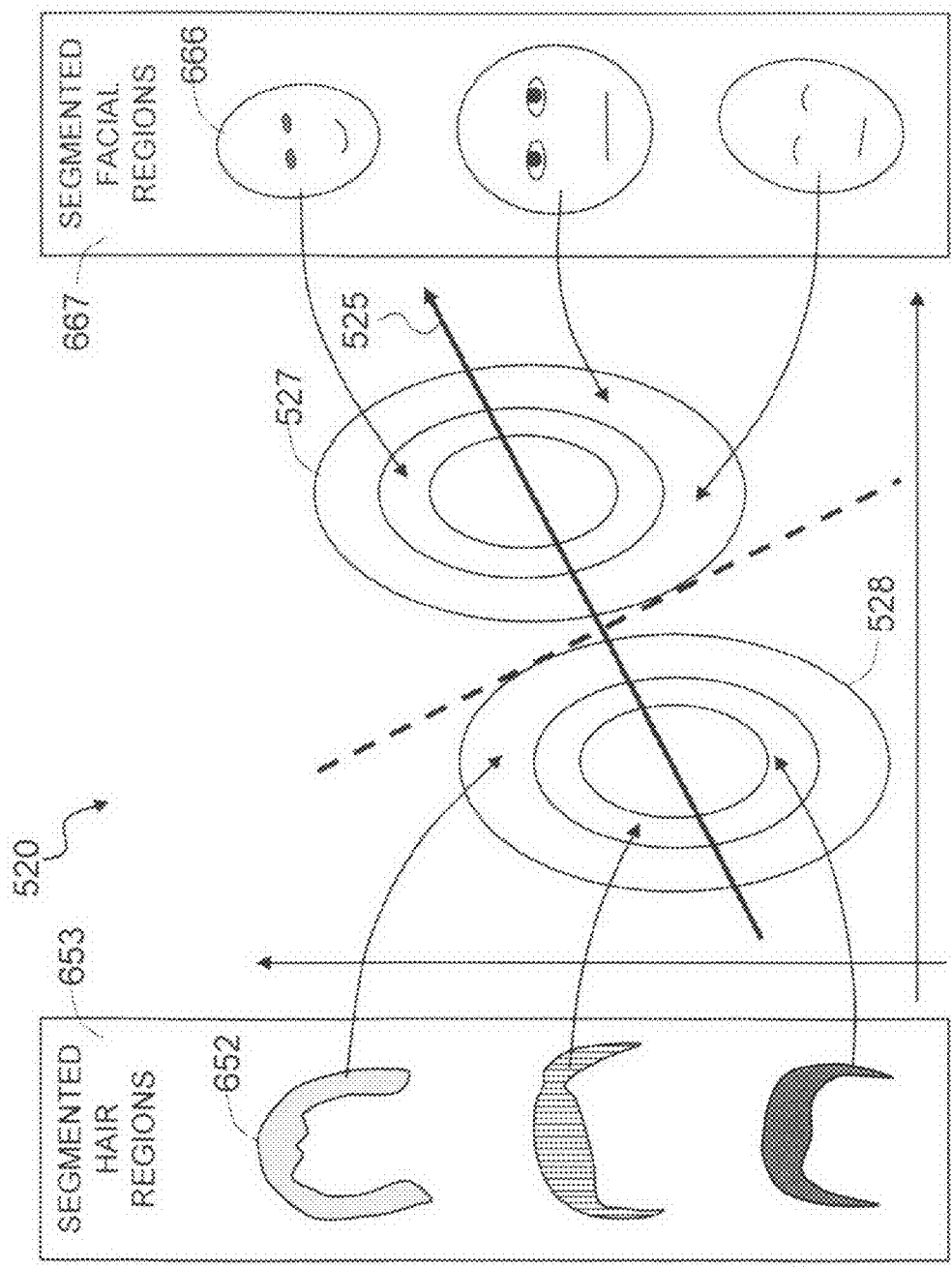
FIG. 8 shows an exemplary embodiment of the skin-hair tone discriminant analysis step.

FIG. 8 shows an exemplary embodiment of the skin-hair tone discriminant analysis 520 step. In this embodiment, the task is carried out using linear discriminant analysis based on the sampled skin tone and hair tone data. First, the skin tone pixels and hair tone pixels are collected from segmented facial regions 667 and segmented hair regions 653; the (R, G, B) pixel color values are collected separately from the segmented skin region 666 and the segmented hair region 652 of each facial image. The (R, G, B) pixel color values are projected to the color space, to form skin tone cluster 527 and hair tone cluster 528. The linear discriminant analysis is performed in the color space to find the direction in color space that best separates the human skin tone cluster 527 and hair tone cluster 528. The direction is called the skin-hair discriminant axis 525. The same kind of analysis can be performed in (H, S, V), (Y, Cr, Cb), or other color space as well.

Figure 9:
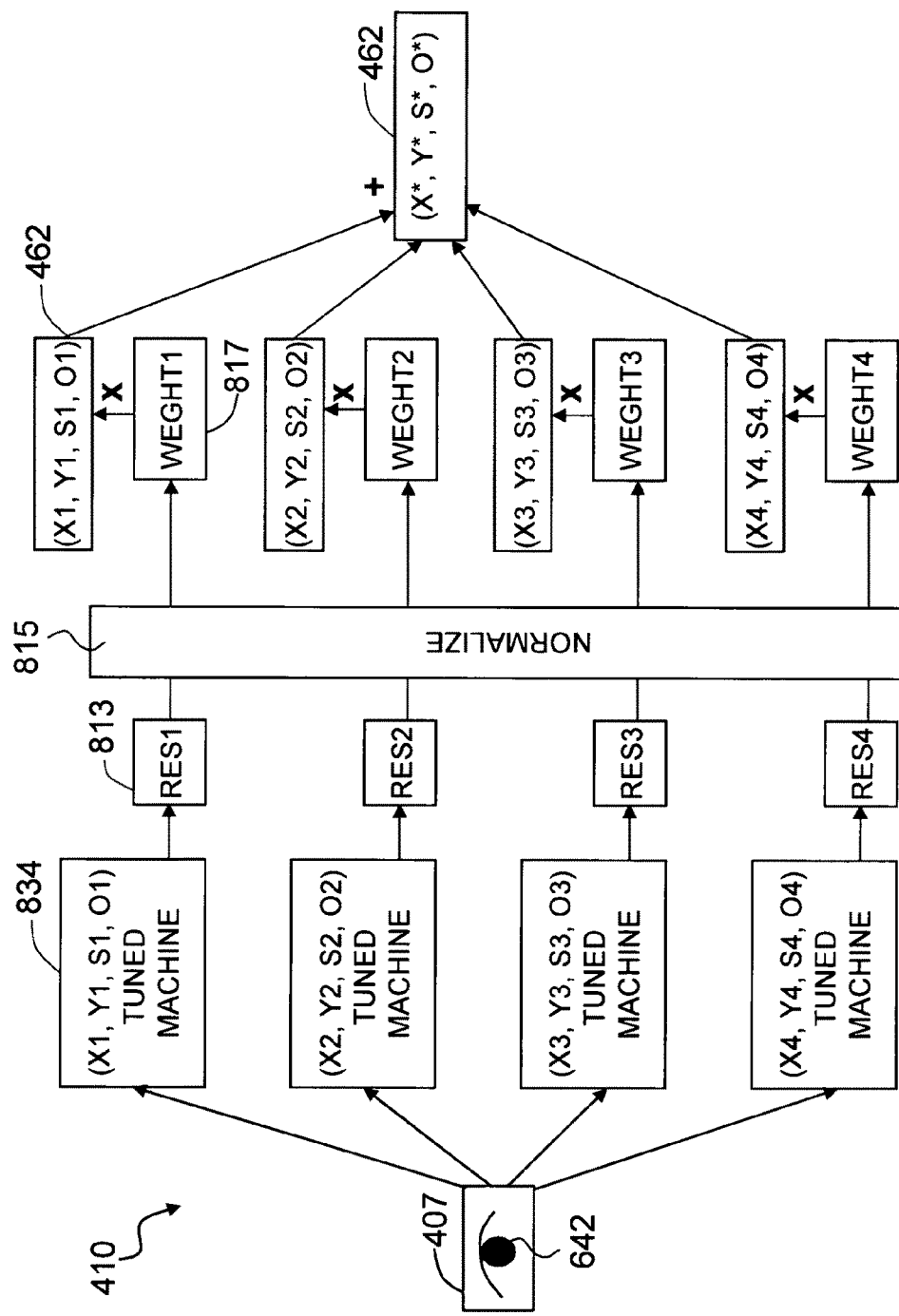
FIG. 9 shows the facial feature localization scheme in an exemplary embodiment of the present invention.

FIG. 9 shows the facial feature localization 410 scheme in an exemplary embodiment of the present invention. Once each facial feature tuned machine 834 has been trained to output the likelihood of the given facial feature to have the predetermined pose vector (xi, yi, si, oi), an array of such learning machines can process any facial feature image 642 to compute the likelihoods.

A given facial feature image 642 inside the standard facial feature window 407 is fed to the trained learning machines, then each machine outputs the responses 813 to the particular pose vector 462 (xi, yi, si, oi). The responses are then normalized 815 by dividing them by the sum of the responses to generate the weights 817. The weight is then multiplied to the corresponding pose vector (xi, yi, si, oi). The pose vectors (x1, y1, s1, o1), (xN, yN, sN, oN) are weighted and added up to compute the estimated pose vector (x*, y*, s*, o*). The pose vector represents the difference in position, scale, and orientation that the given facial feature image has against the standard feature positions and sizes. The pose vector is used to correctly extract the appearance feature and the geometric feature of the facial feature.

Figure 10:
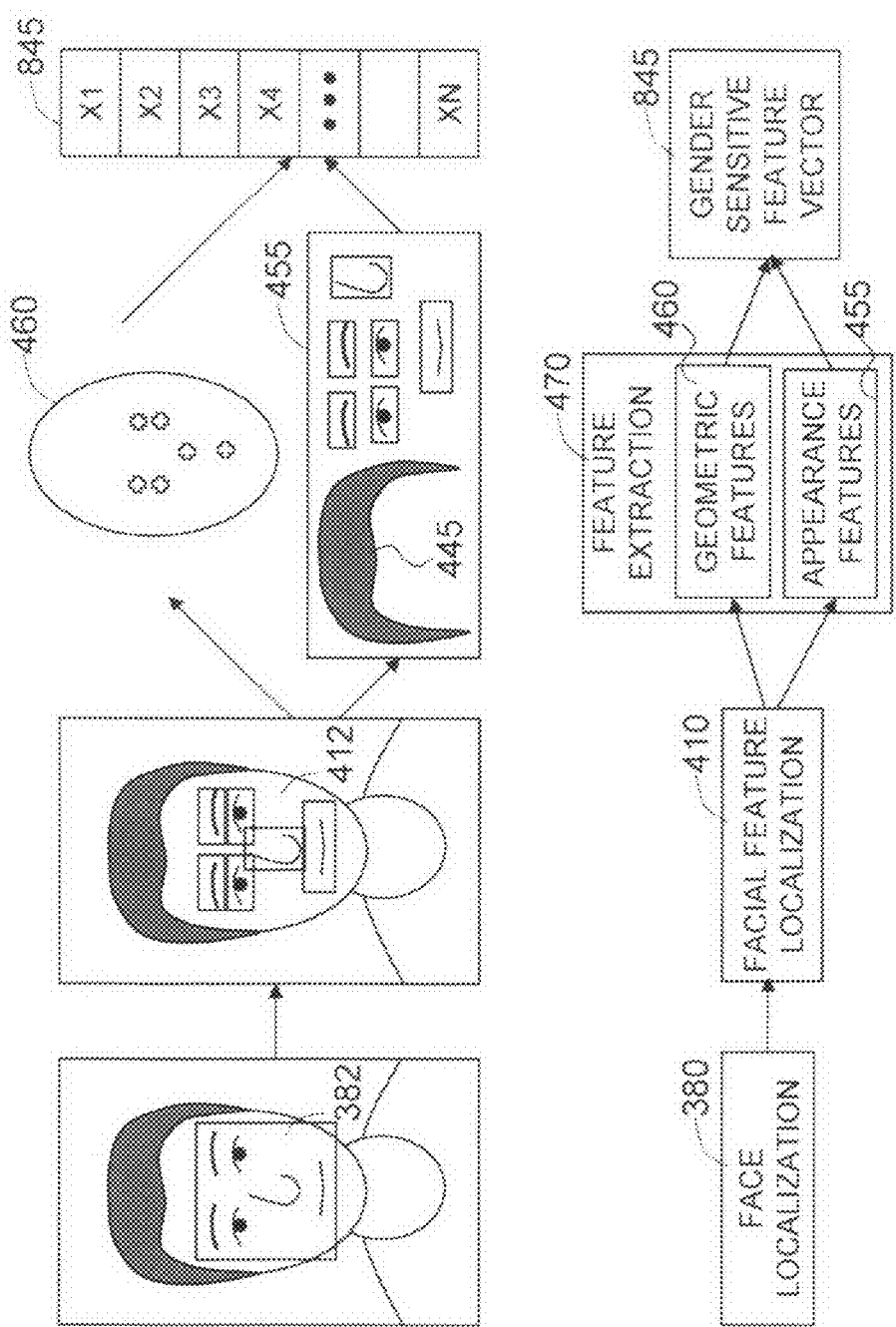
FIG. 10 shows an overview of how a facial image is processed by face localization, facial feature localization, and feature extraction to generate the gender-sensitive feature vector, to be ready to be used in gender recognition.

FIG. 10 shows an overview of how a facial image is processed by face localization, facial feature localization; and feature extraction to generate the gender-sensitive feature vector, to be ready to be used in gender recognition. The face localization 380 step finds the global position, scale, and orientation of the facial image, so that the facial image can be shifted, scaled, and rotated to the standard form to generate the localized face 382. The face localization error and interpersonal differences in facial feature position and scale, are estimated and corrected in the facial feature localization 410 step. The step places the individual facial feature windows to the estimated position in the facial feature localized face 412, where size of the windows match the individually estimated feature sizes.

The feature extraction 470 step then decouples the geometric and appearance information of the facial features. The pixel values of facial feature images within the facial feature window are collected as appearance features 455. Because the feature window can have different sizes among different people, the feature windows belonging to the same feature are scaled to the same size. For example, the left eye feature window for person A can be 20×10 while the left eye feature window for person B can be 14×7; these windows are scaled to 16×8 windows. The feature window positions and sizes are registered as the geometric features 460. The collected appearance and geometric information form a gender-sensitive feature vector 845.

In one exemplary embodiment, the geometric features consist of the coordinates of the centers of the facial feature windows, relative to a reference point which is the mid-point between the left and right eyes.

In another exemplary embodiment, the geometric features consist of the distances between the facial features.

In another exemplary embodiment, the geometric features consist of the set of responses of the facial feature images to the corresponding facial feature localization machines.

Figure 11:
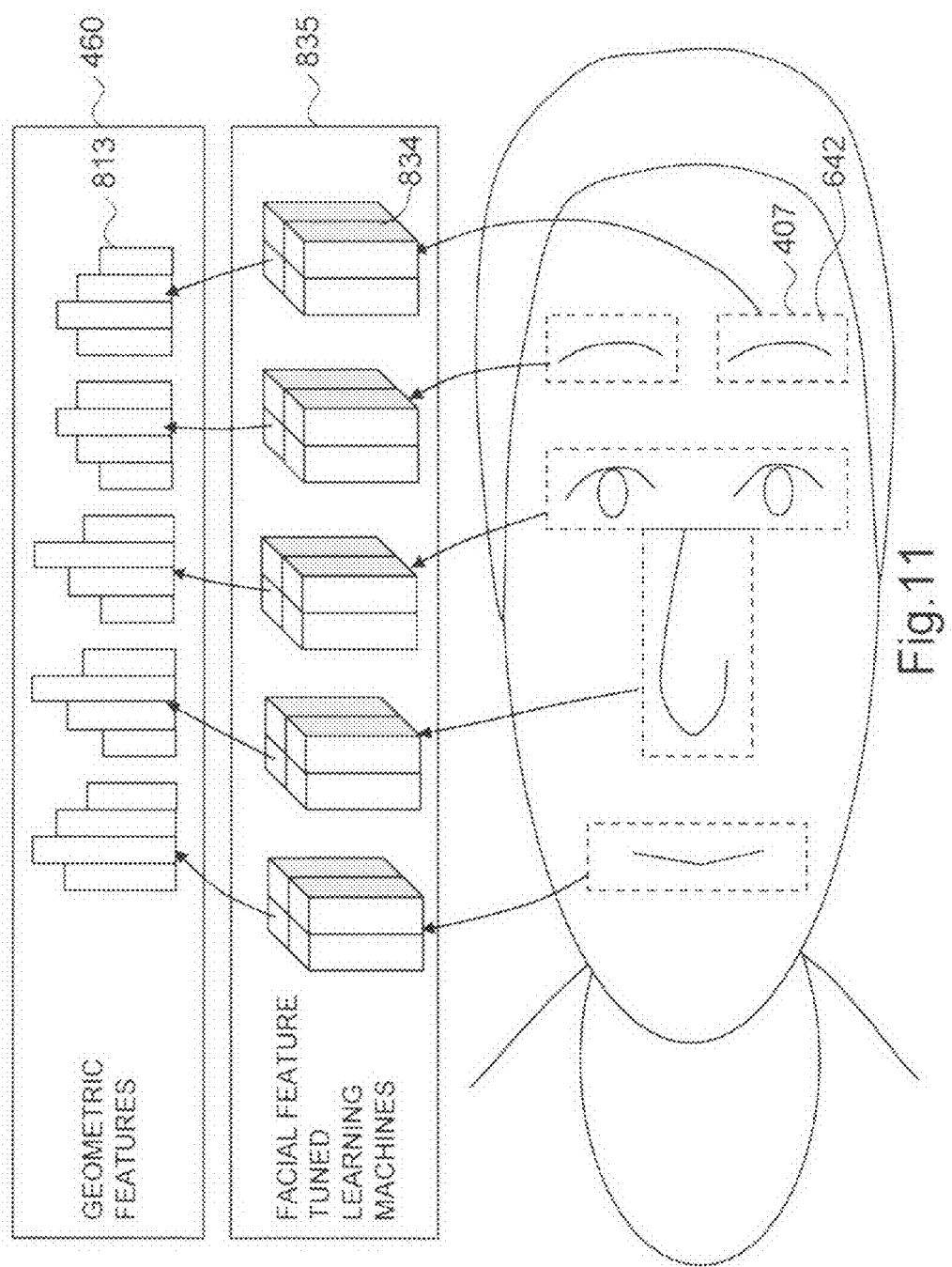
FIG. 11 shows an exemplary embodiment of the geometric feature extraction scheme.

FIG. 11 shows an exemplary embodiment of the geometric feature extraction scheme. In this embodiment, the geometric features 460 are derived from the responses 813 of the facial feature tuned learning machines 835. After the face is accurately localized, the facial feature windows are placed according to the standard feature positions and sizes. Then the array of facial feature tuned learning machines 835 takes each corresponding facial feature image 642 in the standard facial feature window 407, and computes the responses 813. The set of all facial feature responses makes up the geometric features 460. Because the facial feature windows 407 are placed according to the standard feature geometry, the set of responses from the learning machines, where each machine is tuned to a predetermined shifts, size, and orientation of the facial feature, encodes the positional and size difference of the given facial features from the standard forms.

Figure 12:
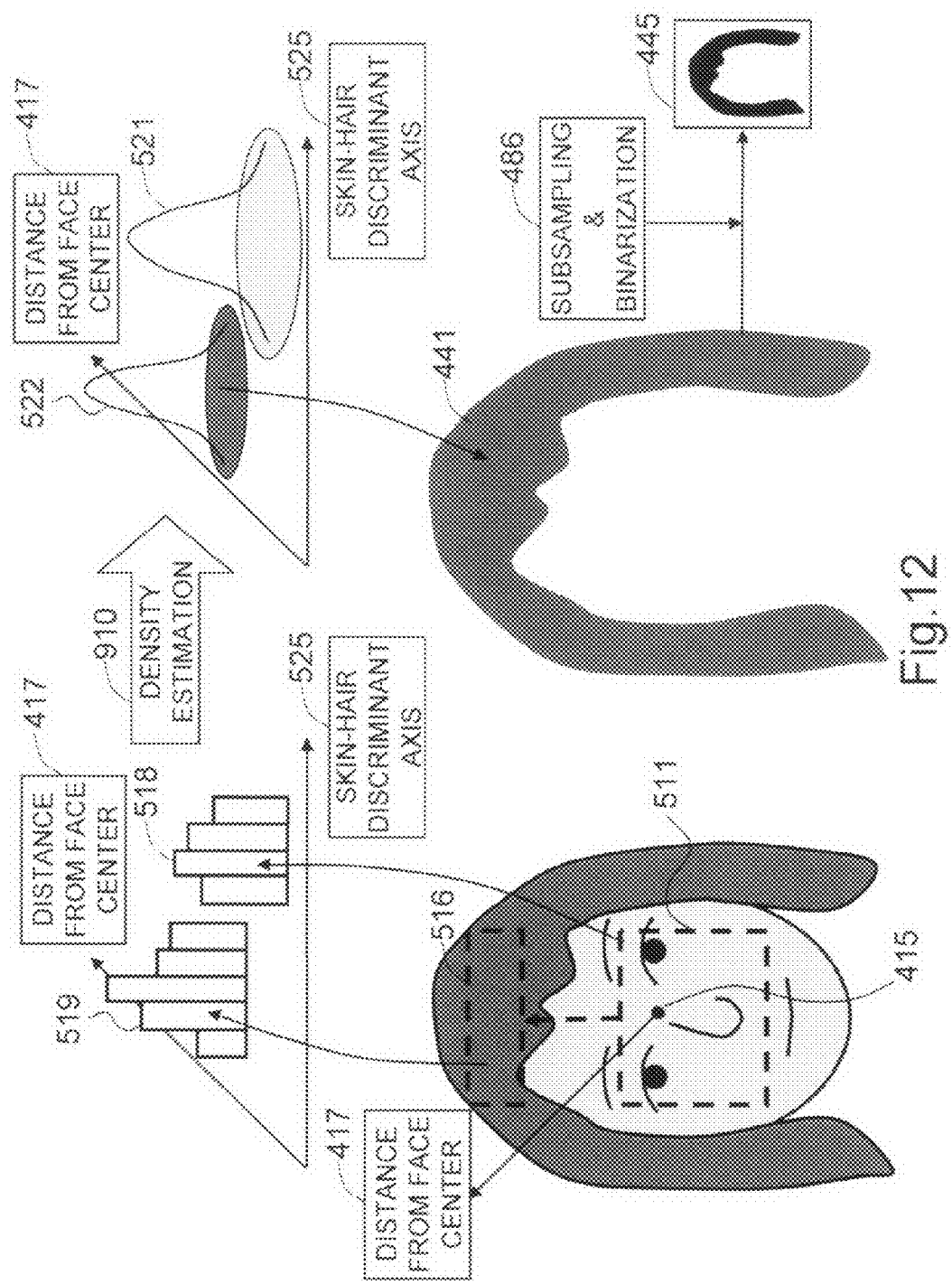
FIG. 12 shows an exemplary embodiment of the hair region extraction scheme.

FIG. 12 shows an exemplary embodiment of the hair region extraction scheme. The shape of the hair region, if successfully estimated, provides very useful information that can help discriminate the gender.

The method is based on color-based segmentation. The hair color of a human is varied among the population, especially according to ethnicity and age. However, in color space, the collection of natural hair color occupies a compact region. The skin-hair discriminant analysis 520 step identifies the direction in color space that best separates the human skin tone and hair tone. The direction is called the skin-hair discriminant axis 525.

The facial feature localization 410 step provides accurate positions of facial features so that the face center 415 (defined as the mid-point between both eyes) can be identified. The color values close to the face center are very likely to have the skin tone of that person, and the color values farther away from the face center, up to a certain point, are likely to have the hair tone. The facial skin tone sampling window 511 and the hair tone sampling window 516 are placed according to the face center position and the size/orientation of the face. The pixel values from each of these windows are collected to construct histograms for both the skin tones and hair tones. First, the color value of the sampled pixel is projected to the skin-hair discriminant axis 525, with a projected value X. Then the distance of the pixel from the face center 417 is measured as Y. Then the pixel is projected to a point (X, Y) in the two-dimensional space. Pixels outside of the windows can also be collected to construct the histograms, but the pixels from the sampling windows have higher confidence.

From the constructed skin tone histogram 518 and the hair tone histogram 519, parametric density estimation 910 is performed to find the center and the spread of each distribution. Typically, Gaussian density estimation is performed to find the mean vectors and the covariance matrices for skin tone distribution 521 and hair tone distribution 522, respectively. Then the region in the two-dimensional space that belongs to the hair tone with high probability is back-projected to the facial image to segment out the hair region 441. That is, the pixels in the facial image whose color values belong to the defined hair tone are selected. The segmented hair region is subsampled and binarized 486, to be used as components in the gender-sensitive vector 845 as a hairstyle feature 445.

Figure 13:
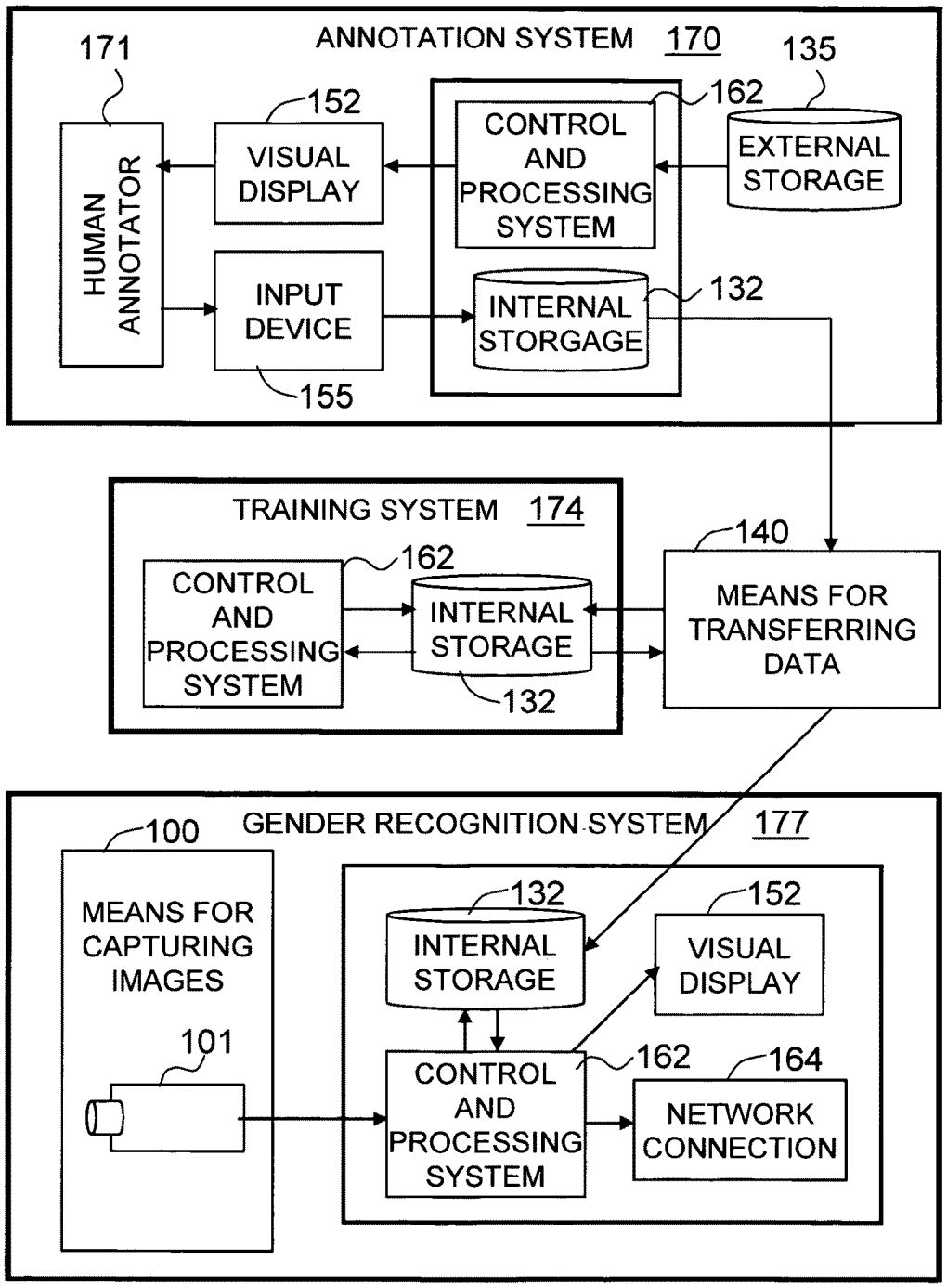
FIG. 13 shows exemplary hardware components in an exemplary embodiment of the present invention.

FIG. 13 shows exemplary hardware components in an exemplary embodiment of the present invention. The hardware components consist of three subsystems: the annotation system 170, the training system 174, and the gender recognition system 177.

In an exemplary embodiment of the present invention, the annotation system 170 comprises a human annotator 171, an external storage 135 with a facial image database, and a computer system that consists of a visual display 152, an input device 155, a control and processing system 162, and an internal storage 132. The external storage 135 can comprise a storage computer server or an external hard disk. The visual display 152 can comprise a CRT or an LCD monitor. The input device 155 can comprise a keyboard and a mouse. In an exemplary embodiment, a Pentium 4 2.8 GHz PC having 1 GB memory can serve as a control and processing system 162. A generic IDE hard disk drive can serve as the internal storage 132. The control and processing system 162 samples and fetches a facial image from the external storage 135, and displays it to the visual display 152. The human annotator 171 then annotates the facial image based on the displayed images, and records the annotated training data to the internal storage 132 using the input device 155.

In an exemplary embodiment of the present invention, the training system 174 comprises a generic personal computer having a control and processing system 162 and an internal storage 132. A Pentium 4 2.8 GHz PC having 1 GB memory can serve as a control and processing system 162. A generic IDE hard disk drive can serve as the internal storage 132. The annotated training data from the annotation system 170 can be transferred to the internal storage 132 of the training system 174 using the means for transferring data 140. The means for transferring data 140 can comprise a direct cable connection or a network connection. The control and processing system then applies the training algorithm to generate the trained learning machines.

In an exemplary embodiment of the present invention, the gender recognition system 177 comprises the means for capturing images 100, a computer system having a control and processing system 162, and an internal storage 132. The trained learning machines can be transferred to the internal storage 132 of the age estimation system 177 using the means for transferring data 140. In the exemplary embodiment, a plurality of means for capturing images 100 are connected to the control and processing system 162. The control and processing system takes digitized video data from the means for capturing images 100. The control and processing system 162 then processes the digitized facial images, using the trained learning machines to classify the age group of the facial image. The classified age can be stored in the internal storage 132, or can be displayed to the visual display 152, or can be transmitted remotely using the network connection 164.

The means for capturing images 100 can comprise an analog camera, USB camera, or Firewire camera. The means for video interface 105, which can comprise a video frame grabber, USB interface, or Firewire interface, is typically included in the same enclosure as the control and processing system 162. The control and processing system 162 can be a general purpose personal computer, such as a Pentium 4 PC, or a dedicated hardware that can carry out the required computation.

In an exemplary embodiment, a general purpose USB webcam can serve as the means for capturing images 100. A Pentium 4 2.8 GHz PC having 1 GB memory can serve as a control and processing system 162. A generic IDE hard disk drive can serve as the internal means for storing data 132.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining the gender of people based on their facial images, comprising the following steps of:
   a) training a plurality of first machines for localizing a face and training a plurality of second machines for localizing facial features in the face using first facial images in a facial image database to extract first gender-sensitive features,
   b) training a learning machine for determining gender using the first gender-sensitive features,
   c) detecting at least a second face from input images of the people captured by at least a means for capturing images, and localizing the second face using the plurality of first machines, and localizing second facial features using the plurality of second machines based on the localized second face, to extract second gender-sensitive features, and
   d) determining the gender of the second face based on the second gender-sensitive features using the trained learning machine for determining gender.

2. The method according to claim 1, wherein the method further comprises a step of annotating locations of facial features, hair regions, and gender labels of the first facial images, in a facial image database.

3. The method according to claim 1, wherein the method further comprises a step of annotating the first facial images in the facial image database with the locations of facial feature landmark points, indexed by the facial features and the face, where a plurality of landmark points delimits a facial feature.

4. The method according to claim 1, wherein the method further comprises a step of annotating first facial images in the facial image database with hair region information by marking the hair tone pixels or marking the boundaries of the hair regions.

5. The method according to claim 1, wherein the method further comprises a step of training a plurality of the first learning machines so that each machine has inherent facial pose, including horizontal and vertical shifts, scale, and orientation, and is tuned to facial images having the inherent facial pose.

6. The method according to claim 1, wherein the method further comprises a step of feeding a facial image to the plurality of the first learning machines, and combining the scores from the learning machines to localize the facial image.

7. The method according to claim 1, wherein the method further comprises a step of training a plurality of second learning machines wherein a subset of the plurality of the second learning machines take part in localizing a specific facial feature, and each learning machine in the subset has inherent pose, including horizontal and vertical shifts, scale, and orientation, of the facial feature, and is tuned to facial feature images having the inherent pose.

8. The method according to claim 1, wherein the method further comprises a step of feeding a facial feature image to the plurality of the second learning machines, and combining the scores from the learning machines to localize the facial feature.

9. The method according to claim 1, wherein the method further comprises a step of constructing first gender-sensitive features by extracting geometric features, appearance features, and hairstyle features of the first facial images, which are localized using the plurality of first learning machines and the plurality of second learning machines.

10. The method according to claim 1, wherein the method further comprises a step of determining a skin-hair tone discriminant axis, which is a direction in color space that best separates the skin tone and hair tone.

11. The method according to claim 10, wherein the method further comprises a step of extracting the hairstyle features of the first facial images, based on the segmented hair region, where the hair region is determined by selecting pixels from the first facial images which belong to the hair tone region in a two-dimensional space of pixels, where the first dimension represents the distance of the pixel from the face center and the second dimension is the skin-hair tone discriminant axis.

12. The method according to claim 11, wherein the method further comprises a step of building a first histogram of pixels from skin tone pixels and a second histogram of pixels from hair tone pixels, and the skin tone region is estimated based on the probability density function derived from the first histogram, and the hair tone region is estimated based on the probability density function derived from the second histogram.

13. The method according to claim 1, wherein the method further comprises a step of extracting geometric features and appearance features of the facial image, where the geometric features are computed from the positions and the sizes of localized facial features and the appearance features are the pixel values from the localized facial features.

14. The method according to claim 13, wherein the method further comprises a step of computing geometric features of the facial features, by using the responses from second machines as the geometric features.

15. An apparatus for determining the gender of people based on their facial images, comprising:
   a) means for training a plurality of first machines for localizing a face and training a plurality of second machines for localizing facial features in the face using first facial images in a facial image database to extract first gender-sensitive features,
   b) means for training a learning machine for determining gender using the first gender-sensitive features,
   c) means for detecting at least a second face from input images of the people captured by at least a means for capturing images, and localizing the second face using the plurality of first machines, and localizing second facial features using the plurality of second machines based on the localized second face, to extract second gender-sensitive features, and
   d) means for determining the gender of the second face based on the second gender-sensitive features using the trained learning machine for determining gender.

16. The apparatus according to claim 15, wherein the apparatus further comprises means for annotating locations of facial features, hair regions, and gender labels of the first facial images, in a facial image database.

17. The apparatus according to claim 15, wherein the apparatus further comprises means for annotating the first facial images in the facial image database with the locations of facial feature landmark points, indexed by the facial features and the face, where a plurality of landmark points delimits a facial feature.

18. The apparatus according to claim 15, wherein the apparatus further comprises means for annotating first facial images in the facial image database with hair region information by marking the hair tone pixels or marking the boundaries of the hair regions.

19. The apparatus according to claim 15, wherein the apparatus further comprises means for training a plurality of the first learning machines so that each machine has inherent facial pose, including horizontal and vertical shifts, scale, and orientation, and is tuned to facial images having the inherent facial pose.

20. The apparatus according to claim 15, wherein the apparatus further comprises means for feeding a facial image to the plurality of the first learning machines, and combining the scores from the learning machines to localize the facial image.

21. The apparatus according to claim 15, wherein the apparatus further comprises means for training a plurality of second learning machines wherein a subset of the plurality of the second learning machines takes part in localizing a specific facial feature, and each learning machine in the subset has inherent pose, including horizontal and vertical shifts, scale, and orientation, of the facial feature, and is tuned to facial feature images having the inherent pose.

22. The apparatus according to claim 15, wherein the apparatus further comprises means for feeding a facial feature image to the plurality of the second learning machines, and combining the scores from the learning machines to localize the facial feature.

23. The apparatus according to claim 15, wherein the apparatus further comprises means for constructing first gender-sensitive features by extracting geometric features, appearance features, and hairstyle features of the first facial images, which are localized using the plurality of first learning machines and the plurality of second learning machines.

24. The apparatus according to claim 15, wherein the apparatus further comprises means for determining a skin-hair tone discriminant axis, which is a direction in color space that best separates the skin tone and hair tone.

25. The apparatus according to claim 24, wherein the apparatus further comprises means for extracting the hairstyle features of the first facial images, based on the segmented hair region, where the hair region is determined by selecting pixels from the first facial images which belong to the hair tone region in a two-dimensional space of pixels, where the first dimension represents the distance of the pixel from the face center and the second dimension is the skin-hair tone discriminant axis.

26. The apparatus according to claim 25, wherein the apparatus further comprises means for building a first histogram of pixels from skin tone pixels and a second histogram of pixels from hair tone pixels, and the skin tone region is estimated based on the probability density function derived from the first histogram, and the hair tone region is estimated based on the probability density function derived from the second histogram.

27. The apparatus according to claim 15, wherein the apparatus further comprises means for extracting geometric features and appearance features of the facial image, where the geometric features are computed from the positions and the sizes of localized facial features, and the appearance features are the pixel values from the localized facial features.

28. The apparatus according to claim 27, wherein the apparatus further comprises means for computing geometric features of the facial features, by using the responses from second machines as the geometric features.

* * * * *